(12) United States Patent
Miao et al.

(10) Patent No.: US 9,838,673 B2
(45) Date of Patent: Dec. 5, 2017

(54) METHOD AND APPARATUS FOR ADJUSTING VIEWING AREA, AND DEVICE CAPABLE OF THREE-DIMENSION DISPLAYING VIDEO SIGNAL

(75) Inventors: Yongping Miao, Shandong (CN); Zhen Zhang, Shandong (CN); Junyu Luo, Shandong (CN); Weisong Gao, Shandong (CN)

(73) Assignees: Hisense Electric Co., Ltd. (CN); Hisense USA Corporation, Suwanee, GA (US)

( * ) Notice: Subject to any disclaimer, the term of this patent is extended or adjusted under 35 U.S.C. 154(b) by 733 days.

(21) Appl. No.: 14/354,949

(22) PCT Filed: Dec. 21, 2011

(86) PCT No.: PCT/CN2011/084388
§ 371 (c)(1),
(2), (4) Date: Aug. 26, 2014

(87) PCT Pub. No.: WO2013/091201
PCT Pub. Date: Jun. 27, 2013

(65) Prior Publication Data
US 2014/0375778 A1    Dec. 25, 2014

(51) Int. Cl.
*H04N 13/04*  (2006.01)

(52) U.S. Cl.
CPC ..... *H04N 13/0402* (2013.01); *H04N 13/0409* (2013.01); *H04N 13/0425* (2013.01);
(Continued)

(58) Field of Classification Search
CPC .. H04N 13/0402; H04N 13/048; H04N 13/04; H04N 13/0477; H04N 13/0481; H04N 13/0484
(Continued)

(56) References Cited

U.S. PATENT DOCUMENTS 8,310,524 B2 * 11/2012 Chen ................. G02B 27/0093
348/42
2001/0019620 A1 * 9/2001 Nagai ................ G06K 9/00228
382/104
(Continued)

FOREIGN PATENT DOCUMENTS

CN          2911717 Y      6/2007
CN          102075776 A    5/2011
(Continued)

*Primary Examiner* — Tung Vo
*Assistant Examiner* — Zaihan Jiang
(74) *Attorney, Agent, or Firm* — DLA Piper LLP (US)

(57) ABSTRACT

Disclosed in the present application are a method and device for determining the position of a viewer and adjusting a viewing area, and a device for displaying three-dimensional video signals, such that the position of a viewer in front of an electronic device can be accurately determined and the viewing area can be adjusted according to the specific position, enabling the viewer to be unaware of any sudden viewing change when watching 3D signals. The method for determining the position of the viewer is applied in an electronic device comprising a display screen capable of displaying three-dimensional video signals. The viewing areas of the electronic device include a three-dimensional display area and a non-three-dimensional display area. The method comprises: acquiring the image in front of the electronic device; judging whether the image contains the face image of the viewer; if the image contains the face image, identifying at least one feature in the face image to determine the position of the viewer; according to the at least one feature, determining whether the viewing area of the viewer is a three-dimensional display area or a non-three-dimensional display area.

22 Claims, 8 Drawing Sheets

(52) U.S. Cl.
CPC ..... *H04N 13/0468* (2013.01); *H04N 13/0475* (2013.01); *H04N 13/0477* (2013.01); *H04N 13/0481* (2013.01); *H04N 13/0484* (2013.01)

(58) Field of Classification Search
USPC .......................................................... 348/51
See application file for complete search history.

(56) References Cited

U.S. PATENT DOCUMENTS

| | | | | |
|---|---|---|---|---|
| 2010/0172567 | A1* | 7/2010 | Prokoski | A61B 5/0064 382/132 |
| 2012/0120247 | A1* | 5/2012 | Kao | H04N 5/23241 348/169 |
| 2013/0093752 | A1* | 4/2013 | Yuan | H04N 13/047 345/419 |

FOREIGN PATENT DOCUMENTS

| | | | |
|---|---|---|---|
| CN | 102098524 A | | 6/2011 |
| DE | 19652689 A1 | * | 6/1998 |
| KR | 10-2012-0031472 A | | 4/2012 |
| WO | 2011/084021 A2 | | 7/2011 |
| WO | 2011/132422 A1 | | 10/2011 |

\* cited by examiner

METHOD AND APPARATUS FOR ADJUSTING VIEWING AREA, AND DEVICE CAPABLE OF THREE-DIMENSION DISPLAYING VIDEO SIGNAL

The present application is a US National Stage of International Application No. PCT/CN2011/084388, filed 21 Dec. 2011, and designating the United States, the content of which is incorporated herein by reference in its entirety.

FIELD OF THE INVENTION

The present invention relates to the field of three-dimension display technologies and particularly to a method and apparatus for adjusting a viewing area and a device capable of three-dimension displaying a video signal.

BACKGROUND OF THE INVENTION

Along with rapid development of 3D technologies, a naked-eye three-dimension display technology is a very appealing frontier technology at present, and research and development institutions and display technology enterprises in the countries all over the world, e.g., Japan, South Korea, Europe, United States, China, etc., are undertaking relevant technical research and product development. With a naked-eye three-dimension display device, a viewer can view directly a three-dimension image like a three-dimension movie without wearing any 3D glasses, which will become the most promising orientation of flat panel displays. There will be more and more liquid crystal three-dimension displays with 2D/3D conversion in place of normal liquid crystal displays in the majority of the market space.

From the technical point of view, the naked-eye three-dimension display device can fall into three categories of barrier, lenticular lens and directional backlight.

Regardless of whichever category, it shall be known whether the 3D image can be viewed at the location of the viewer, and in the prior art, the location of the human eyes is generally recognized by a sensor, and display contents of the three-dimension image are adjusted to have the 3D image viewed by the viewer.

The inventors have identified at least the following technical problems in the existing technical solution during making of this application:

With the location of the human eyes recognized by the sensor, the distance between the viewer and the display can be recognized, and if the viewer is moving from the left to the right and vice versa, then it may be very difficult to recognize to which location the viewer has moved, so the recognition of the location of the human eyes by the sensor cannot determine accurately the movement of the viewer in the horizontal direction and further cannot adjust a viewing area of the viewer according to the particular location.

When the viewer is in a three-dimension display area, a crosstalk area, and a crosstalk area in a retrograde viewing area, the adjustment alone of the three-dimension image in the prior art cannot have the 3D image viewed by the viewer in the crosstalk area.

SUMMARY OF THE INVENTION

Embodiments of this application provide a method and apparatus for determining a location of a viewer, a method and apparatus for adjusting a viewing area and a device capable of three-dimension displaying a video signal, so as to adjust the viewing area accurately according to the location of the viewer, so that the viewer can view a 3D video all the time without any sudden visual change occurring.

An embodiment of this application provides a method for determining a location of a viewer, applicable to an electronic device including a display screen capable of three-dimension displaying a video signal, wherein a viewing area of the electronic device includes a three-dimension display area and a non-three-dimension display area, and the method includes:

obtaining an image in the front of the electronic device;

judging whether a face image of the viewer is included in the image;

determining at least one piece of characteristic information for determining the location of the viewer from the face image when the face image is included in the image; and determining the viewing area of the viewer is the three-dimension display area or the non-three-dimension display area based on the at least one piece of characteristic information.

With the method as described above, obtaining the image in the front of the electronic device further includes: obtaining the image in the front of the electronic device through a photographing apparatus, wherein the photographing apparatus is an apparatus arranged on the electronic device or separated from the electronic device.

When the photographing apparatus is arranged on the electronic device, the photographing apparatus is arranged at a central location of an upper edge frame or a lower edge frame of the display screen.

Judging whether the face image of the viewer is included in the image further includes:

obtaining at least one piece of color information in the image;

judging whether the face image of the viewer is included in the image by judging whether there is skin color information included in the at least one piece of color information; and when there is skin color information included in the at least one piece of color information, determining that the face image of the viewer is included in the image; and when there is no skin color information included in the at least one piece of color information, determining that no face image of the viewer is included in the image.

After determining that no face image of the viewer is included in the image, the method further includes:

when it is determined that no face image of the viewer is included in the image for a preset period of time, lowering a photographing frequency of the photographing apparatus.

The at least one piece of characteristic information includes: information about a location of two eyes, information about a location of a nose, information about a location of two ears, information about a location of eyebrows and/or information about a location of a mouth.

Determining the at least one piece of characteristic information for determining the location of the viewer from the face image further includes:

increasing a contrast of the face image to obtain the contrast-enhanced face image;

binarizing the contrast-enhanced face image by using an adaptive threshold; and processing the binarized contrast-enhanced face image to obtain the information about the location of the two eyes in the face image.

Processing the binarized contrast-enhanced face image to obtain the information about the location of the two eyes in the face image further includes:

performing gray scale integration projection on the binarized contrast-enhanced face image to obtain an area of the two eyes in the face image;

binarizing the area of the two eyes; and positioning the binarized area of the two eyes through hybrid integration projection to obtain the information about the location of the two eyes in the face image.

Determining the location of the viewer is the three-dimension display area or the non-three-dimension display area based on the at least one piece of characteristic information further includes:

determining a movement distance of the viewer relative to a preset reference point based on the information about the location of the two eyes and the reference point; and determining the location of the viewer is the three-dimension display area or the non-three-dimension display area based on the movement distance.

Determining the movement distance of the viewer relative to the preset reference point based on the information about the location of the two eyes and the reference point further includes:

determining coordinates of the human eyes based on a coordinate system which is set on the image and the information about the location of the two eyes, wherein the coordinates of the human eyes refer to a coordinate point on a central axis of the two eyes; and deriving a real movement distance X of the two eyes based on a preset real eye distance E between the two eyes, an eye distance $\Delta E$ between the two eyes in the image and a movement distance $\Delta X$ of the two eyes in the image.

A display distance between an image for the right eye and an image for the left eye of the liquid crystal panel at the distance D is derived to be equal to the real eye distance E between the two eyes based on the formula E:P=D:G; and the viewing area of the viewer is the three-dimension display area or the non-three-dimension display area is determined based on the relationship between the display distance E and the real movement distance X of the two eyes: $X=2\times N\times E\pm a$, wherein N is an integer.

Determining the viewing area of the viewer is the three-dimension display area or the non-three-dimension display area further includes:

with $|a|<E/2$, the viewing area is the three-dimension display area;

with $|a|=E/2$, the viewing area is a crosstalk area in the non-three-dimension display area;

with $E/2<|a|\leq E$, the viewing area is a retrograde viewing area in the non-three-dimension display area.

Another embodiment of this application provides a method for adjusting a viewing area, applicable to an electronic device including a display screen capable of three-dimension displaying a video signal, wherein the display screen includes: a backlight module, a liquid crystal panel arranged on the backlight module, and a liquid crystal grating arranged on the liquid crystal panel, the viewing area of the electronic device includes a three-dimension display area and a non-three-dimension display area, and the method includes:

judging whether a location of a viewer is in a retrograde viewing area in the non-three-dimension display area; and adjusting a parameter related to the display screen to have the location of the viewer positioned in the three-dimension display area of the electronic device when the location of the viewer is in the retrograde viewing area in the non-three-dimension display area.

The method further includes:

judging whether the location of the viewer is in a crosstalk area in the non-three-dimension display area; and moving a location of the liquid crystal grating from a current first location to a second location when the location of the viewer is in the crosstalk area in the non-three-dimension display area, wherein the second location is a location resulting in the location of the viewer is in the three-dimension display area of the electronic device.

Moving the location of the liquid crystal grating from the current first location to the second location further includes:

moving the location of the liquid crystal grating on the liquid crystal panel toward the right or the left to make a distance between the first location and the second location half a width of a light-transmitting portion of the liquid crystal grating.

Adjusting the parameter related to the display screen further includes:

adjusting display locations of an image for the right eye and an image for the left eye on the liquid crystal panel.

Adjusting the parameter related to the display screen further includes:

exchanging locations of a light-transmitting portion and a non-light-transmitting portion in the liquid crystal grating.

The method further includes:

when front-back movement of the viewer in the three-dimension display area of the electronic device is detected, determining an adjustment target value of Q according to the formula $D=G\times Q/(2P-Q)$; and adjusting a distance between grids of the liquid crystal grating to be the adjustment target value of Q based on the adjustment target value, wherein P is a distance between pixels of the liquid crystal panel, Q is the distance between grids of the liquid crystal grating, G is a distance between a pixel of the liquid crystal panel and a grid, and D is a viewing distance.

Another embodiment of this application provides an apparatus for determining a location of a viewer, applicable to an electronic device including a display screen capable of three-dimension displaying a video signal, wherein a viewing area of the electronic device includes a three-dimension display area and a non-three-dimension display area, and the apparatus includes:

an obtaining unit configured to obtain an image in the front of the electronic device;

a first judging unit configured to judge whether a face image of the viewer is included in the image;

a determining unit configured to determine at least one piece of characteristic information for determining the location of the viewer from the face image when the face image is included in the image; and a second judging unit configured to determine the viewing area of the viewer is the three-dimension display area or the non-three-dimension display area based on the at least one piece of characteristic information.

Another embodiment of this application provides an apparatus for adjusting a viewing area, applicable to an electronic device including a display screen capable of three-dimension displaying a video signal, wherein the display screen includes: a backlight module, a liquid crystal panel arranged on the backlight module, and a liquid crystal grating arranged on the liquid crystal panel, the viewing area of the electronic device includes a three-dimension display area and a non-three-dimension display area, and the apparatus includes:

a first judging unit configured to judge whether a location of a viewer is in a retrograde viewing area in the non-three-dimension display area; and a first adjusting unit configured to adjust a parameter related to the display screen to have the location of the viewer positioned in the three-dimension display area of the electronic device when the location of the viewer is in the retrograde viewing area in the non-three-dimension display area.

The apparatus further includes:

a second judging unit configured to judge whether the location of the viewer is in a crosstalk area in the non-three-dimension display area; and a second adjusting unit configured to move a location of the liquid crystal grating from a current first location to a second location when the location of the viewer is in the crosstalk area in the non-three-dimension display area, wherein the second location is a location resulting in the location of the viewer is in the three-dimension display area of the electronic device.

Another embodiment of this application provides a device capable of three-dimension displaying a video signal, wherein a viewing area of the device includes a three-dimension display area and a non-three-dimension display area, and the device includes:

a housing including an edge frame;

a display screen arranged in the housing, wherein the display screen includes: a backlight module; a liquid crystal panel arranged on the backlight module; and a liquid crystal grating arranged on the liquid crystal panel;

an image obtaining apparatus arranged on the edge frame and configured to obtain an image of a foreground of the device;

an image processing unit configured to judge whether a face image of a viewer is included in the image; and to determine at least one piece of characteristic information for determining the location of the viewer from the face image when the face image is included in the image; and a controller configured to judge whether the viewing area of the viewer is the three-dimension display area or the non-three-dimension display area based on the at least one piece of characteristic information; and to generate a control instruction to control the liquid crystal panel or the liquid crystal grating when the viewing area of the viewer is the non-three-dimension display area.

The width of a pixel of the liquid crystal grating is smaller than the width of a pixel of the liquid crystal panel; and the edge frame includes an upper edge frame and a lower edge frame, and the image obtaining apparatus is arranged at a central location of the upper edge frame or the lower edge frame.

Further, the image processing unit includes:

a first judging unit configured to judge whether the face image of the viewer is included in the image;

a determining unit configured to determine at least one piece of characteristic information for determining the location of the viewer from the face image when the face image is included in the image.

With the technical solutions according to the foregoing one or more embodiments, this application has one of the following advantageous technical effects or advantages:

The image in the front of the electronic device is taken by the photographing apparatus, whether there is information about a human face is detected from the difference between the skin color of the person and the color of the background context, and then the real location of the eyes of the viewer is determined with a human-body physiological characteristic tracking technology, so that both the distance between the viewer and the electronic device can be determined and the real location of the viewer in the front of the electronic device in the horizontal direction can be determined accurately;

After the accurate location of the viewer is determined, the viewing area of the viewer is further adjusted by adjusting the images for the left and right eyes or controlling the light-transmitting portion and the non-light-transmitting portion of the grating, so that the viewer can view a 3D image without noticing any sudden visual change;

When the viewer moves forward or backward from a location suitable for viewing, the width of the light-transmitting portion of the slit grating is shrunk or extended to have the 3D image viewed again by the viewer; and In summary, regardless of whether the viewer moves from the left to the right or vice versa or from the front to the back or vice versa, the location of the viewer can be determined accurately with the foregoing technical solutions, and thus corresponding adjustment can be made, so that the viewer can view the 3D image without any sudden visual change occurring.

DETAILED DESCRIPTION OF THE EMBODIMENTS

Embodiments of this application provide a method and apparatus for determining a location of a viewer and adjusting a viewing area and a device capable of three-dimension displaying a video signal, so as to determine accurately the location of the viewer in the front of the electronic device and adjust the viewing area according to the particular location, so that the viewer can view a 3D signal without noticing any sudden visual change.

The foregoing technical solution will be set forth and described in detail below with reference to the drawings and particular embodiments thereof.

First Embodiment

Figure 1:
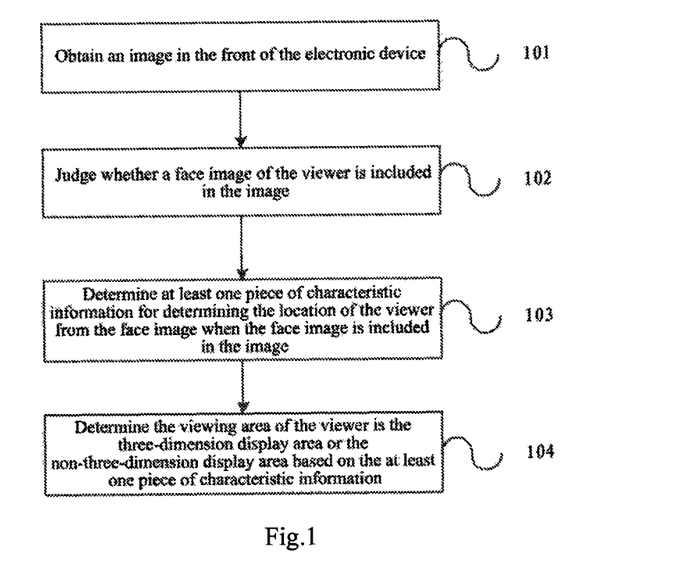
FIG. 1 is a flow chart of a method for determining a location of a viewer in a first embodiment.

As illustrated in FIG. 1, the first embodiment of this application provides a method for determining a location of a viewer, applicable to an electronic device including a display screen capable of three-dimension displaying a video signal, where a viewing area of the electronic device includes a three-dimension display area and a non-three-dimension display area, and the method includes the following steps:

The step 101 is to obtain an image in the front of the electronic device;

The step 102 is to judge whether a face image of the viewer is included in the image;

The step 103 is to determine, from the face image, at least one piece of characteristic information for determining the location of the viewer when the face image is included in the image; and The step 104 is to determine the viewing area of the viewer is the three-dimension display area or the non-three-dimension display area based on the at least one piece of characteristic information.

In the step 101, the image in the front of the electronic device is obtained by obtaining the image in the front of the electronic device through a photographing apparatus, where the photographing apparatus may be arranged on the electronic device, and when the photographing apparatus in the first embodiment of this application is arranged on the electronic device, it may be arranged at the central location of an upper edge frame or a lower edge frame of the display screen; or it may be an apparatus separated from the electronic device, for example, the photographing apparatus is connected to the electronic device via a USB interface.

In the step 102, the photographing apparatus can take a picture without influencing and interfering with normal viewing by the viewer, and it can be judged whether the face image of the viewer is included in the image as follows:

At least one piece of color information in the image is obtained; and

It is judged whether the face image of the viewer is included in the image by judging whether there is skin color information included in the at least one piece of color information.

When there is skin color information included in the at least one piece of color information, it is determined that the face image of the viewer is included in the image; and when there is no skin color information included in the at least one piece of color information, it is determined that no face image of the viewer is included in the image. In the first embodiment of this application, it is detected whether there is human face information of the viewer by distinguishing the human face from the background context due to the difference between the skin color of the person and the color of the surrounding context.

When it is determined that no face image of the viewer is included in the image, if it is determined that no face image of the viewer is included in the image for a preset period of time, then a photographing frequency of the photographing apparatus is lowered, and an image is obtained again.

For the step 103, the at least one piece of characteristic information for determining the location of the viewer is determined from the face image, where the at least one piece of characteristic information includes information about the location of the two eyes, information about the location of the nose, information about the location of the two ears, information about the location of the eyebrows and/or information about the location of the mouth, and since the eyes of the person view a three-dimension image the most intuitively, and two significant characteristics of the area of the human eyes lie firstly in a lower gray scale value of the eye area than that of its surrounding area and secondly in a higher change rate in gray scale of the eye area, so the embodiment of this application will be described by taking the two eyes as an example. A particular process of determining the information about the location of the two eyes of the person is as follows:

A contrast of the face image is increased to obtain the contrast-enhanced face image;

The contrast-enhanced face image is binarized by using an adaptive threshold; and The binarized contrast-enhanced face image is processed to obtain the information about the location of the two eyes in the face image.

Particularly, the binarized contrast-enhanced face image is processed to obtain the information about the location of the two eyes in the face image as follows:

Gray scale integration projection is performed on the binarized contrast-enhanced face image to obtain the area of the two eyes in the face image;

The area of the two eyes is binarized; and

The binarized area of the two eyes is positioned through hybrid integration projection to obtain the information about the location of the two eyes in the face image.

In one embodiment, since the eye area may not be perfectly processed by binarizing the entire human face, a secondary binarization may be needed to binarize the picked portion of the eyes and then determine the information about the location of the two eyes precisely through hybrid integration projection. Separate processing of the picked portion of the eyes can lower the complexity of the calculation and position the information of the two eyes of the viewer effectively, so the precision location of the human eyes in the entire image can be determined accurately with the technical solution according to the first embodiment of this application.

For the information about the location of the nose, the information about the location of the two ears, the information about the location of the eyebrows and/or the information about the location of the mouth, similarly to the determination of the information about the location of the two eyes, coordinate points corresponding to the middle point of the nose, the two ears, the eyebrows or the mouth are taken as their location information and calculated under the same principle, and a repeated description thereof will be omitted here.

Since the viewer may often move in location while viewing television or a movie due to a variety of reasons, for the step 104, after the information about the location of the two eyes of the viewer is obtained, it is judged whether the location of the viewer is in the three-dimension display area or the non-three-dimension display area as follows:

The movement distance of the viewer relative to a preset reference point is determined based on the information about the location of the two eyes and the reference point;

The coordinates of the human eyes are determined based on a coordinate system which is set on the image and the information about the location of the two eyes, where since there are a pair of eyes of the person, the coordinates of the human eyes as referred to below refer to a coordinate point on a central axis of the two eyes for the sake of a convenient description; and A real movement distance X of the two eyes is derived based on a preset real eye distance E between the two eyes, an eye distance ΔE between the two eyes in the image, and a movement distance ΔX of the two eyes in the image.

Figure 2:
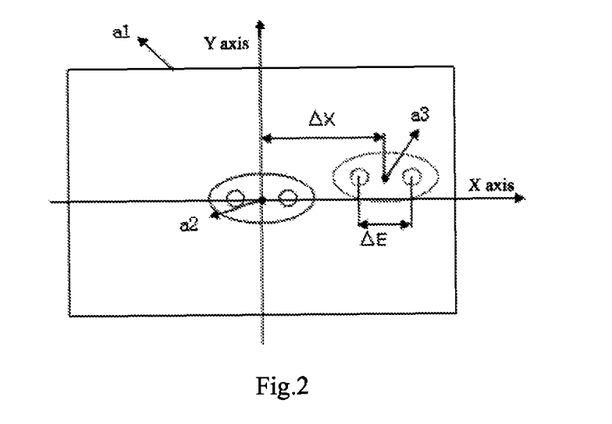
FIG. 2 is a coordinate graph in a picture taken by a photographing apparatus in the first embodiment.

A coordinate system is set on a picture taken by the photographing apparatus, and the starting location of the viewer is assumed as illustrated in FIG. 2, where a1 is the picture taken by the photographing apparatus; a2 is the preset reference point, and since the exactly middle location in the left-right direction in the front of the display screen is the most ideal viewing location, this point is taken as the reference point; and a3 is the coordinate point of the two eyes. Since the information about the location of the human eyes is determined, the coordinates of the human eyes in the coordinate system of the picture can be determined. Moreover, it is assumed that the eye distance between the human eyes is E, the eye distance between the human eyes in the picture is ΔE, the movement distance of the person is X, and the movement distance of the human eyes in the picture is ΔX. Under the law of similarity, it can be known that ΔE:E=ΔX:X. E is assumed as a typical value 65 mm of the human eyes, and since ΔE, E and ΔX are all known, X can be derived.

Based on the movement distance X, it can be determined that the location of the viewer is in the three-dimension display area or the non-three-dimension display area. That is, after the movement distance X of the viewer relative to the reference point is obtained, it is necessary to judge whether the viewer can view a normal three-dimension image at the new location. The relationship between the location of the viewer and a three-dimension viewing area will be described below by taking a slit-grating dual-viewpoint naked-eye 3D display as an example.

Figure 3:
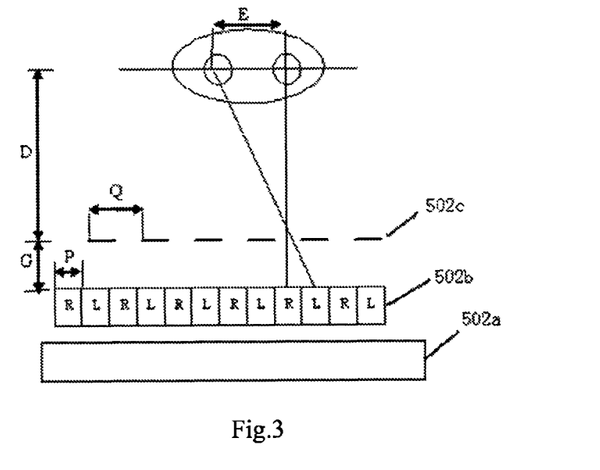
FIG. 3 is a diagram of a relationship between a dual-viewpoint three-dimension image and a viewer.

As illustrated in FIG. 3, which is a diagram of the relationship between a dual-viewpoint three-dimension image and a viewer, where a display screen includes: a backlight module 502a; a liquid crystal panel 502b arranged on the backlight module; and a liquid crystal grating 502c arranged on the liquid crystal panel, where R is an image for the right eye, and L is an image for the left eye. The distance between pixels of the liquid crystal panel is P, the distance between grids of the liquid crystal grating is Q, the distance between a pixel of the liquid crystal panel and a grid is G, a viewing distance is D, and the distance between the two eyes of the viewer is E.

Figure 4:
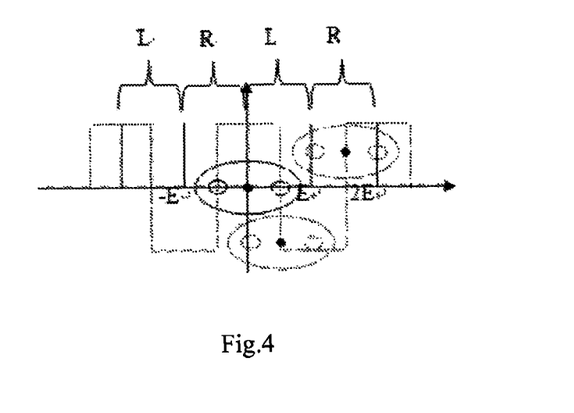
FIG. 4 is a diagram of a relationship between images for the left and right eyes on a liquid crystal panel and the real eye distance between the two eyes.

According to geometry knowledge, the relationships between the respective parameters can be derived as: E:P=D:G and Q:D=2P:(D+G), and according to the proportional relationship E:P=D:G, the display distance between the image R for the right eye and the image L for the left eye of the liquid crystal panel at the distance D is equal to the real eye distance E between the two eyes, as illustrated in FIG. 4.

If the viewer stays at a specific location in the front of the electronic device at a specific moment, and the distance between this location and the reference point in the horizontal direction is X, then the relationship between E and X is X=2×N×E±a, where N is an integer, and ±a represents the plus or minus remainder of the X divided by 2E. Then the condition of the viewing area of the viewer can be determined as follows:

With |a|<E/2, the viewing area is the three-dimension display area;

With |a|=E/2, the viewing area is a crosstalk area in the non-three-dimension display area;

With E/2<|a|≤E, the viewing area is a retrograde viewing area in the non-three-dimension display area.

Second Embodiment

When a viewer is in a forward viewing area, then it is naturally unnecessary to perform any action; but when the viewer is in a non-three-dimension display area, adjustment needs to be made to have the viewer located in the forward viewing area, so that the viewer can view a normal three-dimension image.

Figure 5:
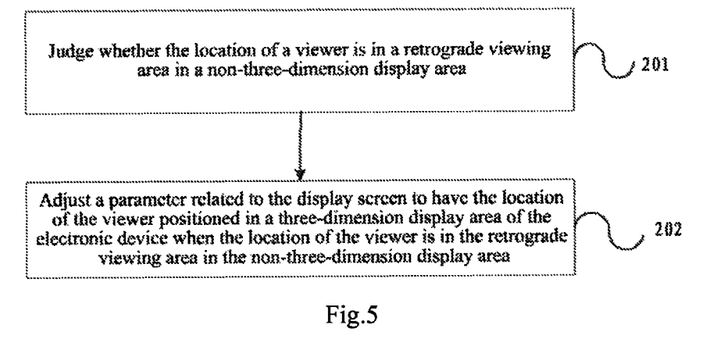
FIG. 5 is a flow chart of a method for adjusting a viewing area when a viewer is in a retrograde viewing area in a second embodiment.

In view of this, the second embodiment of this application provides a method for adjusting a viewing area, applicable to an electronic device including a display screen capable of three-dimension displaying a video signal, where the display screen includes: a backlight module, a liquid crystal panel arranged on the backlight module, and a liquid crystal grating arranged on the liquid crystal panel, and as illustrated in FIG. 5, the method includes the following steps:

The step 201 is to judge whether the location of a viewer is in a retrograde viewing area in a non-three-dimension display area; and The step 202 is to adjust a parameter related to the display screen to have the location of the viewer positioned in a three-dimension display area of the electronic device when the location of the viewer is in the retrograde viewing area in the non-three-dimension display area.

The liquid crystal grating acting as a light shielding plate (a longitudinal slit-shaped liquid crystal grating) is arranged on a liquid crystal display, and when R (an image for the right eye)/L (an image for the left eye) are displayed alternately on the liquid crystal display, if the image for the right eye can only arrive at the right eye and the image for the left eye can only arrive at the left eye, then a parallax of the two eyes occurs for the viewer exactly in the front of the image, to result in three-dimension vision without adjusting the display locations of the images for the left and right eyes, that is, in a forward viewing area.

Figure 6:
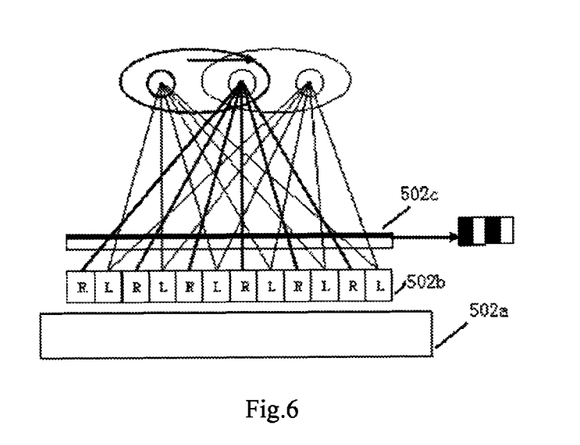
FIG. 6 is a diagram of a relationship between the eyes of the viewer in the retrograde viewing area and images for the left and right eyes on the liquid crystal panel.

As illustrated in FIG. 6, when the viewer moving toward the left or the right enters the retrograde viewing area, the image for the right eye and the image for the left eye initially viewed by the viewer can be exchanged at that time, and the location of the viewer is in the retrograde viewing area, and at that time no three-dimension vision can occur.

Figure 7:
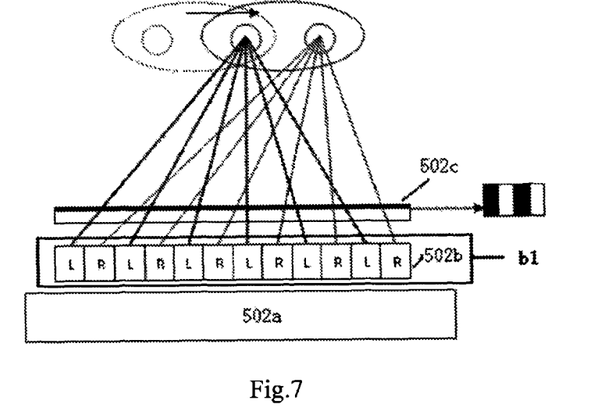
FIG. 7 is a diagram of adjusting the display locations of the images for the left and right eyes.

The parameter related to the display screen can be adjusted as follows:

As illustrated with b1 in FIG. 7, the display locations of the images for the left and right eyes are adjusted, particularly by exchanging the display locations of the images for the left and right eyes on the liquid crystal panel, to enable the viewer to view a three-dimension image.

Figure 8:
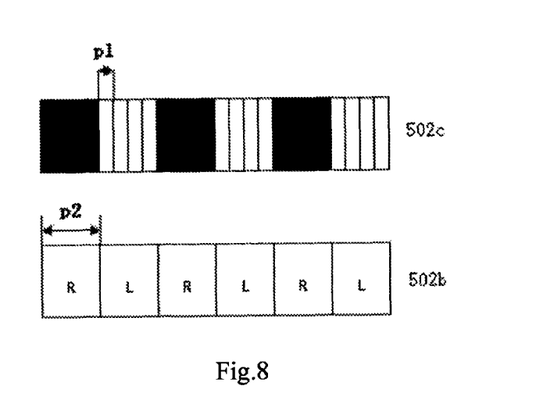
FIG. 8 is a structural diagram of a liquid crystal panel with a slit grating and a display liquid crystal panel.

In addition to the adjustment of the images for the eyes, the purpose can also be achieved by adjusting the liquid crystal grating. Referring to FIG. 8, which illustrates structures of a liquid crystal panel acting as a slit grating and a display liquid crystal panel. As can be apparent from FIG. 8, these two liquid crystal panels are different in pixel width, where the pixel width P1 of the liquid crystal panel acting as a slit grating is lower than the pixel width P2 of the display liquid crystal panel, particularly by an amount which can be selected as needed for a design. In the second embodiment of this application, the relationship between P2 and P1 is P2=4P1.

Figure 9:
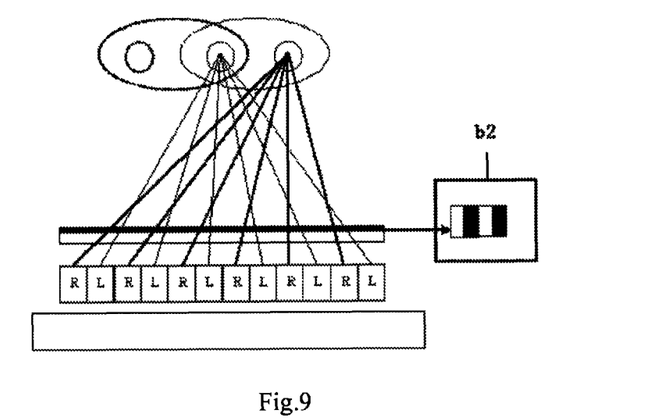
FIG. 9 is a diagram of the exchanged display locations of a light-transmitting portion and a non-light-transmitting portion of a liquid crystal grating.

Thus, as illustrated with b2 in FIG. 9, the locations of a light-transmitting portion and a non-light-transmitting portion in the liquid crystal grating may also be exchanged in addition to the adjustment of the display locations of the images for the left and right eyes, to facilitate a reentry of the viewer into the forward viewing area.

Figure 10:
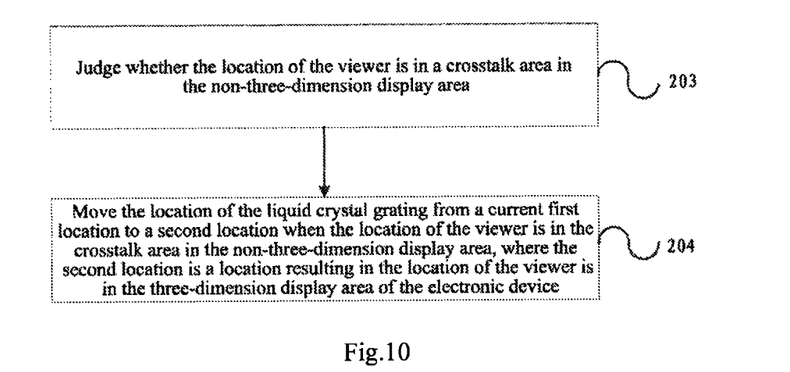
FIG. 10 is a flow chart of a method for adjusting a viewing area when the viewer is in a crosstalk area in the second embodiment.

As illustrated in FIG. 10, the method for adjusting a viewing area further includes the following steps:

The step 203 is to judge whether the location of the viewer is in a crosstalk area in the non-three-dimension display area; and The step 204 is to move the location of the liquid crystal grating from a current first location to a second location when the location of the viewer is in the crosstalk area in the non-three-dimension display area, where the second location is a location resulting in the location of the viewer is in the three-dimension display area of the electronic device.

Figure 11:
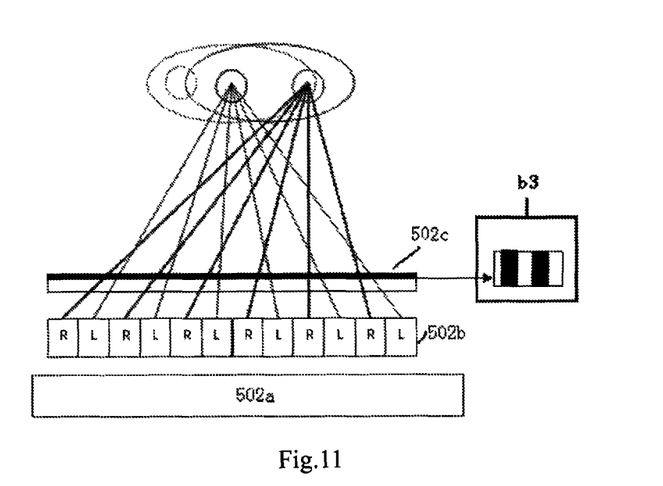
FIG. 11 is a diagram of moving a location of a liquid crystal grating on a liquid crystal panel.

When the viewer is in the crosstalk area, a quit of the viewer from the crosstalk area cannot be facilitated by exchanging the locations of the light-transmitting portion and the non-light-transmitting portion of the grating, and in view of this case, the location of the liquid crystal grating needs to be moved from the current first location to the second location as described in the step 204, particularly as follows:

As illustrated with b3 in FIG. 11, the location of the liquid crystal grating on the liquid crystal panel is moved toward the right or the left, to make the distance between the first location and the second location half the width of the light-transmitting portion of the liquid crystal grating. Thus, the viewer can move from the crosstalk area to the forward viewing area, to view a three-dimension image.

When the viewer moves forward or backward from a location suitable for viewing, what viewed by the right eye of the viewer at that time is a slit-shaped arranged image composed of the image for the left eye and the image for the right eye. The same applies to the left eye, that is, what viewed by the left eye is a slit-shaped arranged image composed of the image for the right eye and the image for the left eye. The viewer viewing such an image cannot view a three-dimension image either.

Thus, when front-back movement of the viewer in the three-dimension display area of the electronic device is detected, adjustment needs to be made, particularly in the following adjusting process:

According to the proportional relationship $Q:D=2P(D+G)$, the formula $D=G \times Q/(2P-Q)$ can be derived, where P is the distance between pixels of the liquid crystal panel, Q is the distance between grids of the liquid crystal grating, G is the distance between a pixel of the liquid crystal panel and a grid, and D is a viewing distance.

As can be apparent from the formula $D=G \times Q/(2P-Q)$, the width Q of a slit is proportional to the viewing distance D, that is, the larger the slit is, the larger the viewing distance is. Thus, this problem can be addressed by extending the width of the slit. On the contrary, if the viewer moves forward from a location suitable for viewing, simply the width of the slit can be shrunk.

Third Embodiment

Figure 12:
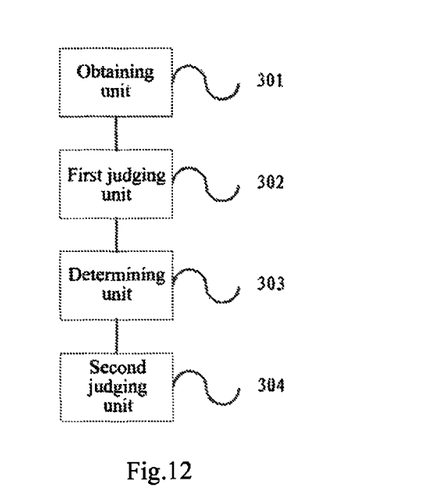
FIG. 12 is a diagram of an apparatus for determining a location of a viewer in a third embodiment.

The third embodiment of this application provides an apparatus for determining a location of a viewer, applicable to an electronic device including a display screen capable of three-dimension displaying a video signal, where a viewing area of the electronic device includes a three-dimension display area and a non-three-dimension display area, and as illustrated in FIG. 12, the apparatus includes:

An obtaining unit 301 configured to obtain an image in the front of the electronic device;

A first judging unit 302 configured to judge whether a face image of the viewer is included in the image;

A determining unit 303 configured to determine at least one piece of characteristic information for determining the location of the viewer from the face image when the face image is included in the image; and A second judging unit 304 configured to determine the viewing area of the viewer is the three-dimension display area or the non-three-dimension display area based on the at least one piece of characteristic information.

The obtaining unit 301 is further configured to obtain the image in the front of the electronic device through a photographing apparatus, where the photographing apparatus is an apparatus arranged on the electronic device or separated from the electronic device.

When the photographing apparatus is arranged on the electronic device, the photographing apparatus is arranged at a central location of an upper edge frame or a lower edge frame of the display screen.

The first judging unit 302 further includes:

An obtaining sub-unit configured to obtain at least one piece of color information in the image;

A first determining sub-unit configured to determine whether the face image of the viewer is included in the image by judging whether there is skin color information included in the at least one piece of color information; and A second determining sub-unit configured to determine that the face image of the viewer is included in the image when there is skin color information included in the at least one piece of color information; and to determine that no face image of the viewer is included in the image when there is no skin color information included in the at least one piece of color information.

The apparatus according to the third embodiment further includes:

A controlling unit configured to lower a photographing frequency of the photographing apparatus when it is determined that no face image of the viewer is included in the image for a preset period of time.

The at least one piece of characteristic information further includes information about a location of the two eyes, information about a location of the nose, information about a location of the two ears, information about a location of the eyebrows and/or information about a location of the mouth.

The determining unit 303 further includes:

A contrast increasing unit configured to increase a contrast of the face image to obtain the contrast-enhanced face image;

A binarizing unit configured to binarize the contrast-enhanced face image by using an adaptive threshold; and An information about location of two eyes obtaining unit configured to process the binarized contrast-enhanced face image to obtain the information about the location of the two eyes in the face image.

Fourth Embodiment

Figure 13:
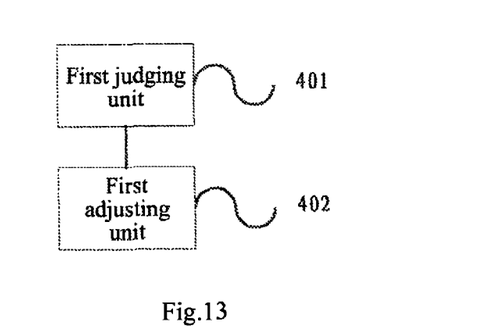
FIG. 13 is a diagram of an apparatus for adjusting a viewing area when a viewer is in a retrograde viewing area in a fourth embodiment.

As illustrated in FIG. 13, the fourth embodiment of this application provides an apparatus for adjusting a viewing area, applicable to an electronic device including a display screen capable of three-dimension displaying a video signal, where the display screen includes: a backlight module, a liquid crystal panel arranged on the backlight module, and a liquid crystal grating arranged on the liquid crystal panel, a viewing area of the electronic device includes a three-dimension display area and a non-three-dimension display area, and the apparatus includes:

A first judging unit 401 configured to judge whether a location of a viewer is in a retrograde viewing area in the non-three-dimension display area; and A first adjusting unit 402 configured to adjust a parameter related to the display screen to have the location of the viewer positioned in the three-dimension display area of the electronic device when the location of the viewer is in the retrograde viewing area in the non-three-dimension display area.

Figure 14:
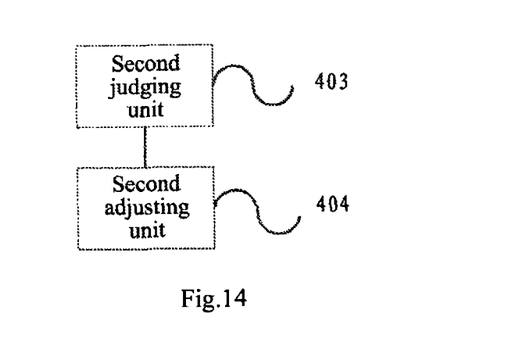
FIG. 14 is a diagram of an apparatus for adjusting a viewing area when the viewer is in a crosstalk area in the fourth embodiment.

As illustrated in FIG. 14, the apparatus according to the fourth embodiment of this application further includes:

A second judging unit 403 configured to judge whether the location of the viewer is in a crosstalk area in the non-three-dimension display area; and A second adjusting unit 404 configured to move a location of the liquid crystal grating from a current first location to a second location when the location of the viewer is in the crosstalk area in the non-three-dimension display area, where the second location is a location resulting in the location of the viewer is in the three-dimension display area of the electronic device.

The second adjusting unit 404 is further configured:

to move the location of the liquid crystal grating on the liquid crystal panel toward the right or the left to make the distance between the first location and the second location half the width of a light-transmitting portion of the liquid crystal grating.

The first adjusting unit 402 is further configured:

to adjust display locations of an image for the right eye and an image for the left eye on the liquid crystal panel; or to exchange locations of a light-transmitting portion and a non-light-transmitting portion in the liquid crystal grating.

Fifth Embodiment

Figure 15:
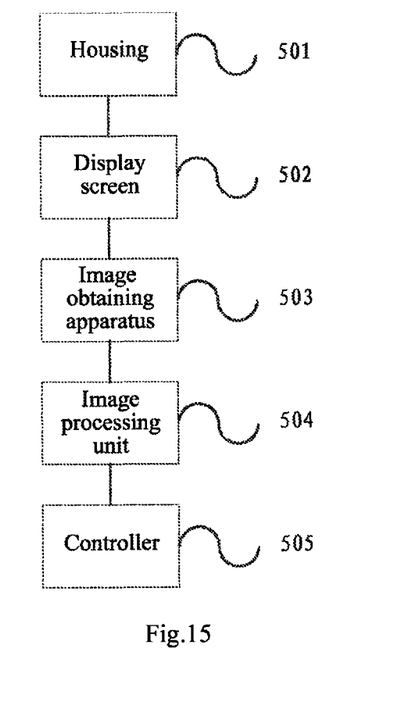
FIG. 15 is a diagram of a device capable of three-dimension displaying a video signal in a fifth embodiment.

As illustrated in FIG. 15, the fifth embodiment of this application provides a device capable of three-dimension displaying a video signal, where a viewing area of the device includes a three-dimension display area and a non-three-dimension display area, and the device includes:

A housing 501 including an edge frame;

A display screen 502 arranged in the housing, where the display screen includes: a backlight module 502a; a liquid crystal panel 502b arranged on the backlight module; and a liquid crystal grating 502c arranged on the liquid crystal panel;

An image obtaining apparatus 503 arranged on the edge frame and configured to obtain an image of a foreground of the device;

An image processing unit 504 configured to judge whether a face image of a viewer is included in the image; and to determine at least one piece of characteristic information for determining the location of the viewer from the face image when the face image is included in the image; and A controller 505 configured to judge whether the viewing area of the viewer is the three-dimension display area or the non-three-dimension display area based on the at least one piece of characteristic information; and to generate a control instruction to control the liquid crystal panel or the liquid crystal grating when the viewing area of the viewer is the non-three-dimension display area.

In the embodiment of this application, the width of a pixel of the liquid crystal grating is set to be smaller than the width of a pixel of the liquid crystal panel, the edge frame includes an upper edge frame and a lower edge frame, and the image obtaining apparatus is arranged at a central location of the upper edge frame or the lower edge frame.

Furthermore, 2D/3D display conversion can be performed easily with the foregoing technical solutions. A naked-eye 3D switch is arranged on a remote controller of the device or the panel of the device, and the user can switch 2D and 3D displays as needed. Just when the viewer powers on a television, the television is in a 2D status. At that time the liquid crystal grating is inoperative, and there is no any influence on a 2D program. When the user switches to a 3D status, the image obtaining apparatus and the image processing unit, and the controller start operating.

Moreover, in some embodiments of the invention, an intelligent control system is adopted for the photographing apparatus, and the photographing frequency can be adjusted or the photographing function can be disabled automatically according to whether there is the viewer in the taken image, to conserve the resources.

With the technical solutions according to the foregoing one or more embodiments, this application has one of the following advantageous technical effects or advantages:

The image in the front of the electronic device is taken by the photographing apparatus, whether there is information about a human face is detected from the difference between the skin color of the person and the color of the background context, and then the real location of the eyes of the viewer is determined with a human-body physiological characteristic tracking technology, so that both the distance between the viewer and the electronic device can be determined and the real location of the viewer in the front of the electronic device in the horizontal direction can be determined accurately;

After the accurate location of the viewer is determined, the viewing area of the viewer is further adjusted by adjusting the images for the left and right eyes or controlling the light-transmitting portion and the non-light-transmitting portion of the grating, so that the viewer can view a 3D image without noticing any sudden visual change;

When the viewer moves forward or backward from a location suitable for viewing, the width of the light-transmitting portion of the slit grating is shrunk or extended to have the 3D image viewed again by the viewer;

Furthermore, switching between 2D and 3D displays can be performed, so that the user can switch freely between 2D and 3D, and the drawback of a low resolution of a display image in the 2D status can be addressed.

In summary, regardless of whether the viewer moves from the left to the right or vice versa or from the front to the back or vice versa, the location of the viewer can be determined accurately with the foregoing technical solutions, and thus corresponding adjustment can be made, so that the viewer can view the 3D image without any sudden visual change occurring.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The embodiments of the invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently, those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of determining a location of a viewer, applicable to an electronic device comprising a display screen capable of three-dimension displaying a video signal, wherein a viewing area of the electronic device comprises a three-dimension display area and a non-three-dimension display area, and the method comprising:

obtaining an image in the front of the electronic device;

obtaining information about a location of two eyes of a viewer in the image;

determining a movement distance of two eyes of the viewer relative to a preset reference point based on the information about the location of the two eyes and the reference point, wherein the preset reference point is on a symmetric axis of a left-right direction in the front of the display screen; and determining a location of the viewer is in the three-dimension display area or the non-three-dimension display area based on the movement distance, wherein determining a movement distance of two eyes of the viewer relative to the preset reference point based on the information about the location of the two eyes and the reference point comprises:

determining coordinates of human eyes based on a coordinate system which is set on the image and the information about the location of the two eyes, wherein the coordinates of the human eyes refer to a coordinate point on a central axis of the two eyes;

deriving a real movement distance X of the two eyes based on a preset real eye distance E between the two eyes, an eye distance $\Delta E$ between the two eyes in the image and a movement distance $\Delta X$ of the two eyes in the image; and wherein determining the viewing area of the viewer is the three-dimension display area or the non-three-dimension display area based on the movement distance comprises:

deriving a display distance between an image for the right eye and an image for the left eye of the liquid crystal panel at the distance D to be equal to the real eye distance E between the two eyes based on the formula E:P=D:G, wherein P is a distance between pixels of the liquid crystal panel, Q is a distance between grids of a liquid crystal grating, G is a distance between a pixel of the liquid crystal panel and a grid, and D is the viewing distance; and determining the viewing area of the viewer is the three-dimension display area or the non-three-dimension display area based on the relationship between the display distance E and the real movement distance X of the two eyes: $X=2 \times N \times E \pm a$, wherein N is an integer, and wherein:

with $|a|<E/2$, the viewing area is the three-dimension display area;

with $|a|=E/2$, the viewing area is a crosstalk area in the non-three-dimension display area;

with $E/2<|a|<E$, the viewing area is a retrograde viewing area in the non-three-dimension display area.

2. The method according to claim 1, wherein obtaining the image in the front of the electronic device further comprises: obtaining the image in the front of the electronic device through a photographing apparatus, wherein the photographing apparatus is an apparatus arranged on the electronic device or separated from the electronic device.

3. The method according to claim 2, wherein when the photographing apparatus is arranged on the electronic device, the photographing apparatus is arranged at a central location of an upper edge frame or a lower edge frame of the display screen.

4. A method of adjusting a viewing area, applicable to an electronic device comprising a display screen capable of three-dimension displaying a video signal, wherein the display screen comprises a backlight module, a liquid crystal panel arranged on the backlight module, and a liquid crystal grating arranged on the liquid crystal panel, the viewing area of the electronic device comprises a three-dimension display area and a non-three-dimension display area, the method comprising:

judging whether a location of a viewer is in a retrograde viewing area in the non-three-dimension display area; and adjusting a parameter related to the display screen to have the location of the viewer positioned in the three-dimension display area of the electronic device when the location of the viewer is in the retrograde viewing area in the non-three-dimension display area; wherein when front-back movement of the viewer in the three-dimension display area of the electronic device is detected, determining an adjustment target value of Q according to the formula $D=G \times Q/(2P-Q)$; and adjusting a distance between grids of the liquid crystal grating to be the adjustment target value of Q based on the adjustment target value, wherein P is a distance between pixels of the liquid crystal panel, Q is the distance between grids of the liquid crystal grating, G is a distance between a pixel of the liquid crystal panel and a grid, and D is a viewing distance.

5. The method according to claim 4, further comprising:
judging whether the location of the viewer is in a crosstalk area in the non-three-dimension display area; and
moving a location of the liquid crystal grating from a current first location to a second location when the location of the viewer is in the crosstalk area in the non-three-dimension display area, wherein the second location is a location resulting in the location of the viewer is in the three-dimension display area of the electronic device.

6. The method according to claim 5, wherein moving the location of the liquid crystal grating from the current first location to the second location further comprises:
moving the location of the liquid crystal grating on the liquid crystal panel toward the right or the left to make a distance between the first location and the second location half a width of a light-transmitting portion of the liquid crystal grating.

7. The method according to claim 4, wherein adjusting the parameter related to the display screen further comprises:
adjusting display locations of an image for the right eye and an image for the left eye on the liquid crystal panel.

8. The method according to claim 4, wherein adjusting the parameter related to the display screen further comprises:
exchanging locations of a light-transmitting portion and a non-light-transmitting portion in the liquid crystal grating.

9. A device capable of three-dimension displaying a video signal, wherein a viewing area of the device comprises a three-dimension display area and a non-three-dimension display area, the device comprising:
a housing comprising an edge frame;
a display screen arranged in the housing, wherein the display screen comprises: a backlight module; a liquid crystal panel arranged on the backlight module; and a liquid crystal grating arranged on the liquid crystal panel;
an image obtaining apparatus arranged on the edge frame and configured to obtain an image of a foreground of the device;
an image processing unit configured to obtain information about a location of two eyes of a viewer in the image, and determine a movement distance of two eyes of the viewer relative to a preset reference point based on the information about the location of the two eyes and the reference point, wherein the preset reference point is on a symmetric axis of a left-right direction in the front of the display screen; and
a controller configured to judge whether the viewing area of the viewer is the three-dimension display area or the non-three-dimension display area based on the movement distance; and when front-back movement of the viewer in the three-dimension display area of the electronic device is detected, to determine an adjustment target value of Q according to the formula $D=G\times Q/(2P-Q)$, and adjust a distance between grids of the liquid crystal grating to be the adjustment target value of Q based on the adjustment target value, wherein P is a distance between pixels of the liquid crystal panel, Q is the distance between grids of the liquid crystal grating, G is a distance between a pixel of the liquid crystal panel and a grid, and D is a viewing distance.

10. The device according to claim 9, wherein the width of a pixel of the liquid crystal grating is smaller than the width of a pixel of the liquid crystal panel.

11. The device according to claim 10, wherein the edge frame comprises an upper edge frame and a lower edge frame, and the image obtaining apparatus is arranged at a central location of the upper edge frame or the lower edge frame.

12. The method according to claim 4, further comprising:
obtaining an image in the front of the electronic device;
judging whether a face image of the viewer is comprised in the image;
determining at least one piece of characteristic information used to determine the location of the viewer from the face image when the face image is comprised in the image; and
determining the viewing area of the viewer is the three-dimension display area or the non-three-dimension display area based on the at least one piece of characteristic information.

13. The method according to claim 12, wherein obtaining the image in the front of the electronic device further comprises obtaining the image in the front of the electronic device through a photographing apparatus, wherein the photographing apparatus is an apparatus arranged on the electronic device or separated from the electronic device.

14. The method according to claim 13, wherein when the photographing apparatus is arranged on the electronic device, the photographing apparatus is arranged at a central location of an upper edge frame or a lower edge frame of the display screen.

15. The method according to claim 13, wherein judging whether the face image of the viewer is comprised in the image further comprises:
obtaining at least one piece of color information in the image;
judging whether the face image of the viewer is comprised in the image by judging whether there is skin color information in the at least one piece of color information; and
when there is skin color information in the at least one piece of color information, determining that the face image of the viewer is in the image; and when there is no skin color information in the at least one piece of color information, determining that no face image of the viewer is in the image.

16. The method according to claim 15, wherein, after determining that no face image of the viewer is in the image, the method further comprises:
when it is determined that no face image of the viewer is in the image for a preset period of time, lowering a photographing frequency of the photographing apparatus.

17. The method according to claim 12, wherein the at least one piece of characteristic information comprises information about a location of two eyes, information about a location of a nose, information about a location of two ears, information about a location of eyebrows and/or information about a location of a mouth.

18. The method according to claim 17, wherein determining the at least one piece of characteristic information used to determine the location of the viewer from the face image further comprises:
increasing a contrast of the face image to obtain the contrast-enhanced face image;
binarizing the contrast-enhanced face image by using an adaptive threshold; and
processing the binarized contrast-enhanced face image to obtain the information about the location of the two eyes in the face image.

19. The method according to claim 18, wherein processing the binarized contrast-enhanced face image to obtain the information about the location of the two eyes in the face image further comprises:
performing gray scale integration projection on the binarized contrast-enhanced face image to obtain an area of the two eyes in the face image;
binarizing the area of the two eyes; and
positioning the binarized area of the two eyes through hybrid integration projection to obtain the information about the location of the two eyes in the face image.

20. The method according to claim 19, wherein determining the location of the viewer is the three-dimension display area or the non-three-dimension display area based on the at least one piece of characteristic information further comprises:
determining a movement distance of the viewer relative to a preset reference point based on the information about the location of the two eyes and the reference point; and
determining the location of the viewer is the three-dimension display area or the non-three-dimension display area based on the movement distance.

21. The method according to claim 20, wherein determining the movement distance of the viewer relative to the preset reference point based on the information about the location of the two eyes and the reference point further comprises:
determining coordinates of the human eyes based on a coordinate system set on the image and the information about the location of the two eyes, wherein the coordinates of the human eyes refer to a coordinate point on a central axis of the two eyes; and
deriving a real movement distance X of the two eyes based on a preset real eye distance E between the two eyes, an eye distance $\Delta E$ between the two eyes in the image and a movement distance $\Delta X$ of the two eyes in the image.

22. The method according to claim 21, wherein determining the viewing area of the viewer is the three-dimension display area or the non-three-dimension display area based on the movement distance further comprises:
deriving a display distance between an image for the right eye and an image for the left eye of the liquid crystal panel at the distance D to be equal to the real eye distance E between the two eyes based on the formula E:P=D:G, wherein P is a distance between pixels of the liquid crystal panel, Q is a distance between grids of a liquid crystal grating, G is a distance between a pixel of the liquid crystal panel and a grid, and D is the viewing distance; and
determining the viewing area of the viewer is the three-dimension display area or the non-three-dimension display area based on the relationship between the display distance E and the real movement distance X of the two eyes: $X=2 \times N \times E \pm a$, wherein N is an integer, and wherein:
with $|a|<E/2$, the viewing area is the three-dimension display area;
with $|a|=E/2$, the viewing area is a crosstalk area in the non-three-dimension display area;
with $E/2<|a|<E$, the viewing area is a retrograde viewing area in the non-three-dimension display area.

* * * * *